July 20, 1965 W. P. DUMKE ETAL 3,196,384

ULTRASONIC AMPLIFIER

Filed Feb. 27, 1962 2 Sheets-Sheet 1

INVENTORS
WILLIAM P. DUMKE
RUDOLPH R. HAERING

BY John F. Ohlandt Jr.
ATTORNEY

July 20, 1965 W. P. DUMKE ETAL 3,196,384

ULTRASONIC AMPLIFIER

Filed Feb. 27, 1962 2 Sheets-Sheet 2

United States Patent Office 3,196,384

Patented July 20, 1965

3,196,384

ULTRASONIC AMPLIFIER

William P. Dumke, Chappaqua, and Rudolph R. Haering, Peekskill, N.Y., assignors to International Business Machines Corporation, New York, N.Y., a corporation of New York Filed Feb. 27, 1962, Ser. No. 176,011
7 Claims. (Cl. 340—15)

This invention relates to amplification and, in particular, to apparatus and techniques for attaining untrasonic amplification in certain materials.

It has been known that ultrasonic amplification is possible in cadmium sulfide crystals when the drift velocity of optically excited electrons in an electric field is greater than the velocity of sound. Acoustic gain is observed in cadmium sulfide even though the number of free carriers is relatively small because of the strong piezoelectric interaction between the carriers and long wavelength untrasonic waves. For a detailed discussion of ultrasonic amplification in cadmium sulfide, reference may be made to an article entitled "Ultrasonic Amplification in Cadmium Sulfide" by Hutson et al. in the Physical Review Letters, Vol. 7, No. 6, September 15, 1961.

In principal, there is no reason why the above-mentioned effect in cadmium sulfide could not also be observed in materials which are not piezoelectric, but which have higher carrier concentrations. However, a practical difficulty arises from the fact that by the time the carriers have drift velocities comparable to the velocities of sound, the current density is very large. For example, in bismuth, a drift velocity of $10^5$ cm./sec. implies a current density of about $6\times10^3$ amp./cm.$^2$ at 2° K., whereas with higher carrier concentrations, the corresponding current densities are even higher.

It is, therefore, an object of the present invention to attain untrasonic amplification in materials of high carrier concentration, such as, for example, the semimetals: bismuth, arsenic and antimony.

Another object is to enable ultrasonic amplification in materials such as the semimetals without involving large values of current density in such materials.

A further object is to extend the useful range of ultrasonic amplification to very high frequencies, on the order of 100–1000 megacycles.

According to a broad feature of the present invention, a crystalline body has applied thereto substantially perpendicular electric and magnetic fields, $$\vec{E} \text{ and } \vec{H}$$

With this arrangement both electrons and holes drift in the $$E \times \vec{H}$$

direction, with the velocity of these carriers being given by $$v=\frac{Ec}{H}$$

where c=velocity of light. It will be shown that an ultrasonic wave propagating with a velocity $s$ in the $$\vec{E} \times \vec{H}$$

direction may be amplified by the current carriers when $$\frac{Ec}{H}>s$$

The foregoing and other objects, features and advantages of the invention will be apparent from the following more particular description of a preferred embodiment of the invention, as illustrated in the accompanying drawings.

In the drawings:

FIG. 1 portrays a moving sound wave in a semimetal crystalline body wherein electrons and holes are also moving.

Although in the description of the ultrasonic amplifier of the present invention reference will be made to the use of semimetal materials and, in particular, to the use of bismuth, it will be understood that the principles of the present invention are not limited thereto. Since a semimetal material has been chosen to illustrate a perferred embodiment of the present invention, it is considered well to review briefly the electrical properties of semimetals.

Although in the past materials have been roughly classified into metals, which are good conductors of electricity, semiconductors and insulators, there is in addition a unique class of materials known as semimetals which generally include the elements of the second subgroup of the fifth group of the Periodic Table; namely, bismuth, arsenic and antimony, as well as their alloys. In contrast with semiconductor materials whose energy level diagrams are shown with the valence band and conduction band edges separated by a forbidden region or gap, semimetals exhibit in their energy band picture an overlap of the valence and conduction bands. This overlap for bismuth is on the order of 0.020 electron volt. In a pure semimetal this gives rise to equal numbers of holes and electrons, even at low temperatures, in the almost-filled valence and almost-empty conduction bands, respectively. In very pure semimetals and, in particular, for the case of bismuth, electrons have very low electron mass and exhibit anisotropy, that is, they move more readily in certain directions through the crystalline body than in other directions. Also, electrons have a very high mobility in bismuth, on the order of $10^7$ cm.$^2$/volt-sec. at low temperatures of approximately 2° K. as compared with 3000 cm.$^2$/volt-sec. at room temperature. In addition, the mean-free path of electrons is very long in bismuth on the order of 2–3 mm. at the low temperatures of operation as compared with 100–1000 angstroms for germanium at room temperature. For further information on the semimetals and on their novel and desirable device applications, reference may be had to co-pending application Serial No. 176,018, "Semimetal Electronic Element", assigned to the assignee of the present invention.

It has been discovered that when a semimetal crystalline body has strong electric and magnetic fields imposed upon it, enhanced phonon emission occurs. At the occurrence of this phonon emission, the velocity of carriers which travel in the $$\vec{E} \times \vec{H}$$

direction $$\left(v=\frac{Ec}{H}\right)$$

has been found, for example in bismuth, to be close to the sound velocity $s$ therein ($s\approx10^5$ cm./sec.).

Figure 1:
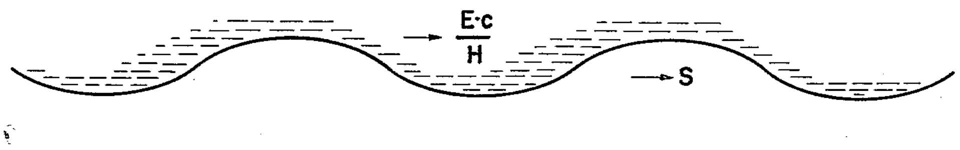

Referring now to FIG. 1, a model is there given that will aid in understanding the underlying concept of the present invention: the amplification of a sound wave in a crystalline body. The effect of the sound wave is to produce a wave-like potential which the electrons (and holes) see. When the electrons are moving faster than the velocity of sound, $s$, they tend to bunch up on the trailing edge of the potential produced by the sound wave. The bunched electrons see an electrical field due to the sound wave which is just opposite in sign to the electrical current that their motion produces. Therefore, instead of putting energy into the electrons, as occurs in normal conductivity, the electric field of the sound wave takes energy from the electrons and the wave becomes energetic, which is to say, it is amplified. The realization of ultrasonic amplification in semimetals will be understood from the following considerations. If $n_0$ is the number of electrons or holes, $e$ the electronic charge, $E_n$ and $E_p$ deformation potential constants for electrons and holes, respectively, $\tau_r$ the carrier lifetime, D an "average" diffusion constant, $\mu$ the reduced mobility and $$k=\frac{2\pi}{\lambda}$$

is the wave vector of the sound wave, $\rho$=density, $s$= sound velocity, then the attenuation constant (negative for amplification) is given by:

$$\alpha=\frac{en_0\mu(E_n-E_p)^2k^2}{\rho s^3}\left[\frac{\frac{1}{k\tau_r}\left(Dk+\frac{1}{k\tau_r}\right)-s\left(\frac{Ec}{H}-s\right)}{\left(Dk+\frac{1}{k\tau_r}\right)^2+\left(\frac{Ec}{H}-s\right)^2}\right]$$

For the case of bismuth with $H=10^4$ gauss, $s=10^5$ cm./sec., $k=10^4$ cm.$^{-1}$, $E_n-E_p=10$ volts, $\mu=50$ cm.$^2$/volt-sec., $D=1$ cm.$^2$/sec., $\tau_r=10^{-8}$, $\rho=10$ gram/cm.$^3$, one finds that $\alpha=-75$ cm.$^{-1}$, which corresponds to a gain of 300 db/cm. of travel.

Ultrasonic amplification in accordance with the present invention differs substantially from prior-art schemes, one example of which has been previously alluded to. In the prior-art scheme described in the reference article, the carriers are caused to drift by applying an electric field in the direction of wave propagation, and the carriers within the cadmium sulfide body are created by optical excitation. Another difference lies in the frequency dependence of amplification. The present scheme shows a stronger increase with frequency than the prior-art scheme.

Figure 2:
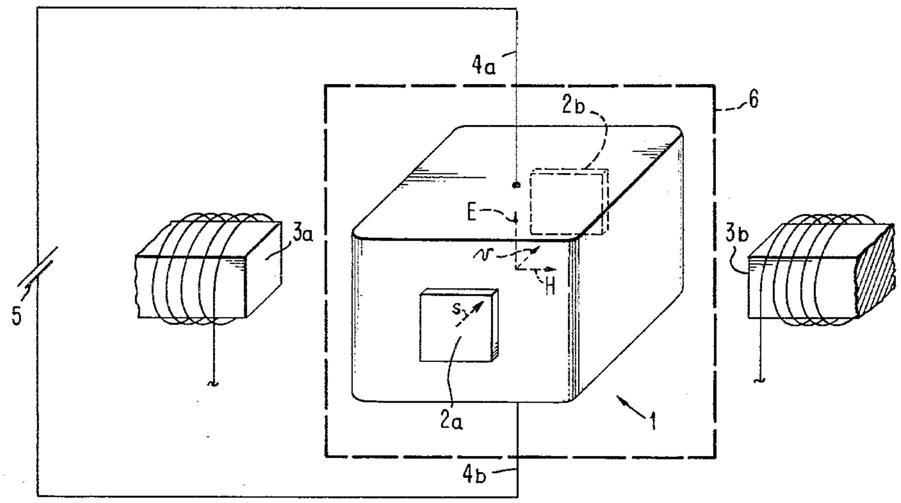
FIG. 2 is a three-dimensional view showing the semimetal crystalline body and its associated apparatus for producing ultrasonic amplification.

Referring now to FIG. 2, there is shown a semimetal crystalline body generally indicated by reference numeral 1. This crystalline body may, for example, be constituted of bismuth. On opposite faces of the semimetal body 1 there are affixed an ultrasonic signal source 2*a* and a utilization means 2*b*. The ultrasonic signal source 2*a* may comprise any suitable means for providing ultrasonic energy to the crystalline body 1. Typically, this ultrasonic source 2*a* may comprise a transducer of a conventional type, such as of quartz, which is well known to those skilled in the art for transducing from electrical to sonic energy. The utilization means 2*b* may likewise be a typical output means such as a sonic line or even a transducer, for sensing the ultrasonic wave propagated through the crystalline body 1. Contiguous to the side faces of the crystalline body 1 are magnetic means 3*a* and 3*b* for providing the requisite magnetic field. A pair of conductors 4*a* and 4*b* are soldered or otherwise attached to the top and bottom faces of the body 1. These conductors are connected to a supply source 5, shown as a battery, for providing the requisite electric field. The dotted line 6 which surrounds the crystalline body 1 in FIG. 2 represents conventional apparatus that is used for providing the very low temperatures necessary for the proper operation of the ultrasonic amplifier of the present invention.

The arrows labelled E and H placed inside the crystalline body 1 indicate the substantial perpendicularity of the aforesaid applied magnetic and electric fields. The arrow labelled $v$ which is shown perpendicular to both the electric and magnetic fields represents the velocity of carriers, holes and electrons, within the crystalline body. The arrow labelled $s$ shown adjacent to the ultrasonic source 2*a* represents the velocity of a sound wave propagated through the crystalline body.

In operation, the device of the present invention will produce, as hereinbefore indicated, amplification of a sound wave which has been introduced into the crystalline body 1 when the condition is satisfied that $$\frac{Ec}{H}>s$$

Thus, it is only necessary to select operating values for the electric and magnetic fields that satisfy this relation and for which the cyclotron frequency is large compared to the reciprocal scattering time.

Figure 3:
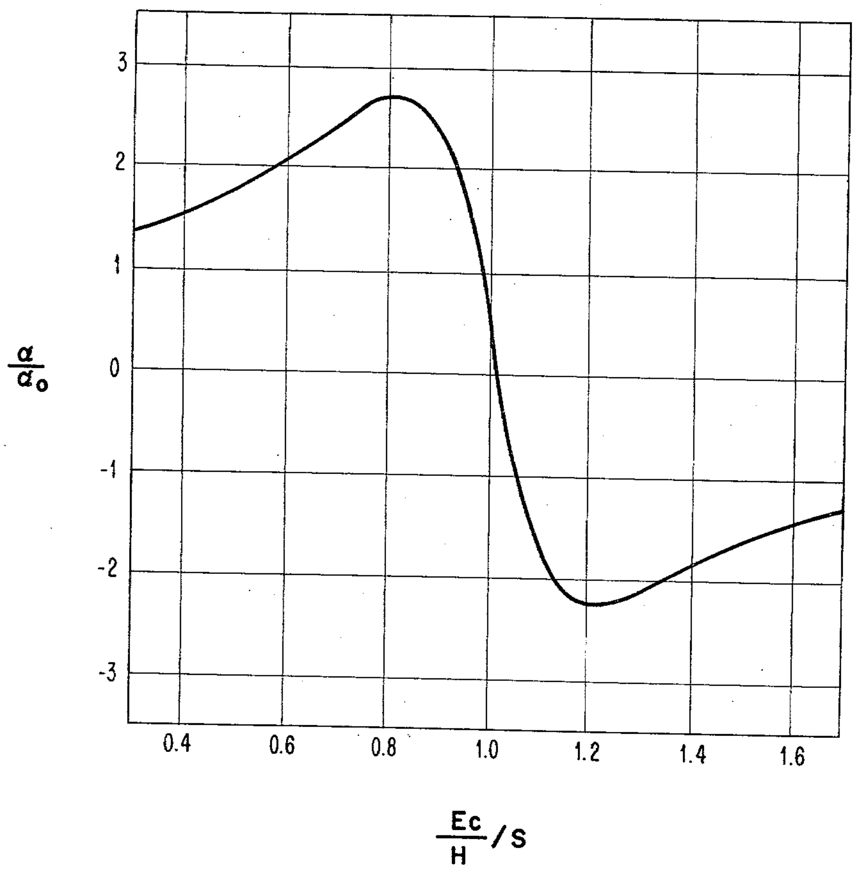
FIG. 3 is a graph depicting the variation of the attenuation constant with the ratio $$\frac{Ec}{H}/s$$

For optimum operation, that is, for achieving the optimum value of amplification, it is necessary to select the corresponding ratio as is indicated in FIG. 3.

Referring now to FIG. 3, it will be seen that with a value of approximately 1.2 for the ratio of $$\frac{Ec}{H}/s$$

the highest negative value of attenuation is realized and, thus, the highest value of amplification is obtained. The curve shown in FIG. 3 is derived from a consideration of the dependence of attenuation upon several factors. The previously-given formula for the attenuation constant is:

$$\alpha=\frac{en_0\mu(E_n-E_p)^2k^2}{\rho s^3}\left[\frac{\frac{1}{k\tau_r}\left(Dk+\frac{1}{k\tau_r}\right)-s\left(\frac{Ec}{H}-s\right)}{\left(Dk+\frac{1}{k\tau_r}\right)^2+\left(\frac{Ec}{H}-s\right)^2}\right]$$

The magnitude of the attenuation constant $\alpha$ is primarily determined by the factor outside the brackets in the above equation. As an example we should consider a transverse mode in bismuth with $s=10^5$ cm./sec. and $k\sim10^4$ cm.$^{-1}$ ($\nu\simeq100$M c./sec.) and $H=10^4$ gauss. A reasonable value for $E_n-E_p$ is 10 volts. Using $\mu=50$ cm.$^2$/volt sec., the factor outside of the brackets is given as:

$$\alpha_0=\frac{en_0\mu(E_n-E_p)^2k^2}{\rho s^3}\simeq30\text{ cm.}^{-1}$$

The minimum value of the bracketed quantity is in a typical case, $-2.5$, as can be seen by referring to FIG. 3. Therefore, the maximum negative value for $\alpha$ is approximately $-75$ cm.$^{-1}$ at a value of 1.2 for $$\frac{Ec}{H}/s$$

The attenuation constant $\alpha$ is obtained for $D=1$ cm.$^2$/sec. and $\tau_r\sim10^{-8}$ sec. This value of $\tau_r$ is reasonable for bismuth at low temperatures.

The practical advantage that the scheme of the present invention affords is that much lower current densities and much higher frequencies can be amplified. This is so because by the time the carrier drift velocity in the direction of wave propagation is equal to the wave velocity, the carrier drift velocity in the direction of the electric field is only $$\frac{s}{\omega_c\tau}$$

where $\omega_c$ is the cyclotron frequency and $\tau$ is the scattering time. In bismuth, for example, $\omega_c\tau\simeq1000$ at 2° K. Since for bismuth $n\simeq4\times10^{17}$ carriers/cc., this means that amplification is obtained for current densities of approximately 6 amp./cm.$^2$, whereas, the prior-art scheme alluded to would require approximately 6000 amp./cm.$^2$ in bismuth. In addition, the particular power densities required for the onset of the amplification are the same for both the technique of the present invention and that of the prior art, being approximately 100 watt/cm.$^3$ for bismuth at the low operating temperature. However, the application of a magnetic field raises the impedance level of the sample and thereby reduces contact and series resistance problems.

What has been disclosed is a novel technique and apparatus used therewith for attaining ultrasonic amplification, particularly in semimetal materials. Essential to the technique is the fact that no appreciable Hall voltage is set up for materials which have equal electron and hole concentrations when the applied magnetic field is large. However, as will be apparent to the skilled worker in the art, a similar effect will be observed in materials with just one type of carrier in arrangements where no Hall field is allowed to build up, such as, for example, in the well-known Corbino disk.

While the invention has been particularly shown and described with reference to a preferred embodiment thereof, it will be understood by those skilled in the art that various changes in form and details may be made therein without departing from the spirit and scope of the invention.

What is claimed is:

1. An ultrasonic amplifier comprising, in combination:

a crystalline body to which are applied substantially perpendicular electric and magnetic fields whereby the velocity of carriers within the crystalline body is perpendicular to the aforesaid electric and magnetic fields, said electric and magnetic field having such values that $$\frac{Ec}{H}=v>s$$

where $v$ equals the velocity of carriers in the crystalline body and $s$ equals the sound velocity in said crystalline body and $c$ equals the velocity of light;

and means for introducing a sound wave into said crystalline body in the direction of the velocity of said carriers in said body, whereby ultrasonic amplification of said sound wave is achieved.

2. The invention as defined in claim 1 wherein said crystalline body is constituted of a semimetal.

3. The invention as defined in claim 2 wherein said body is constituted of bismuth.

4. The invention as defined in claim 2 wherein said body is constituted of arsenic.

5. The invention as defined in claim 2 wherein said body is constituted of antimony.

6. The invention as defined in claim 2 including utilization means for sensing the amplified sound wave in said crystalline body.

7. The invention as defined in claim 1 including utilization means for sensing the amplified sound wave in said crystalline body.

References Cited by the Examiner

UNITED STATES PATENTS

| | | | |
|---|---|---|---|
| 2,500,953 | 3/50 | Libman | 330—60 |
| 2,553,491 | 5/51 | Shockley | 330—6 |
| 2,743,322 | 4/56 | Pierce et al. | 330—5 |

SAMUEL FEINBERG, *Primary Examiner.*

KATHLEEN H. CLAFFY, *Examiner.*